UNITED STATES PATENT OFFICE.

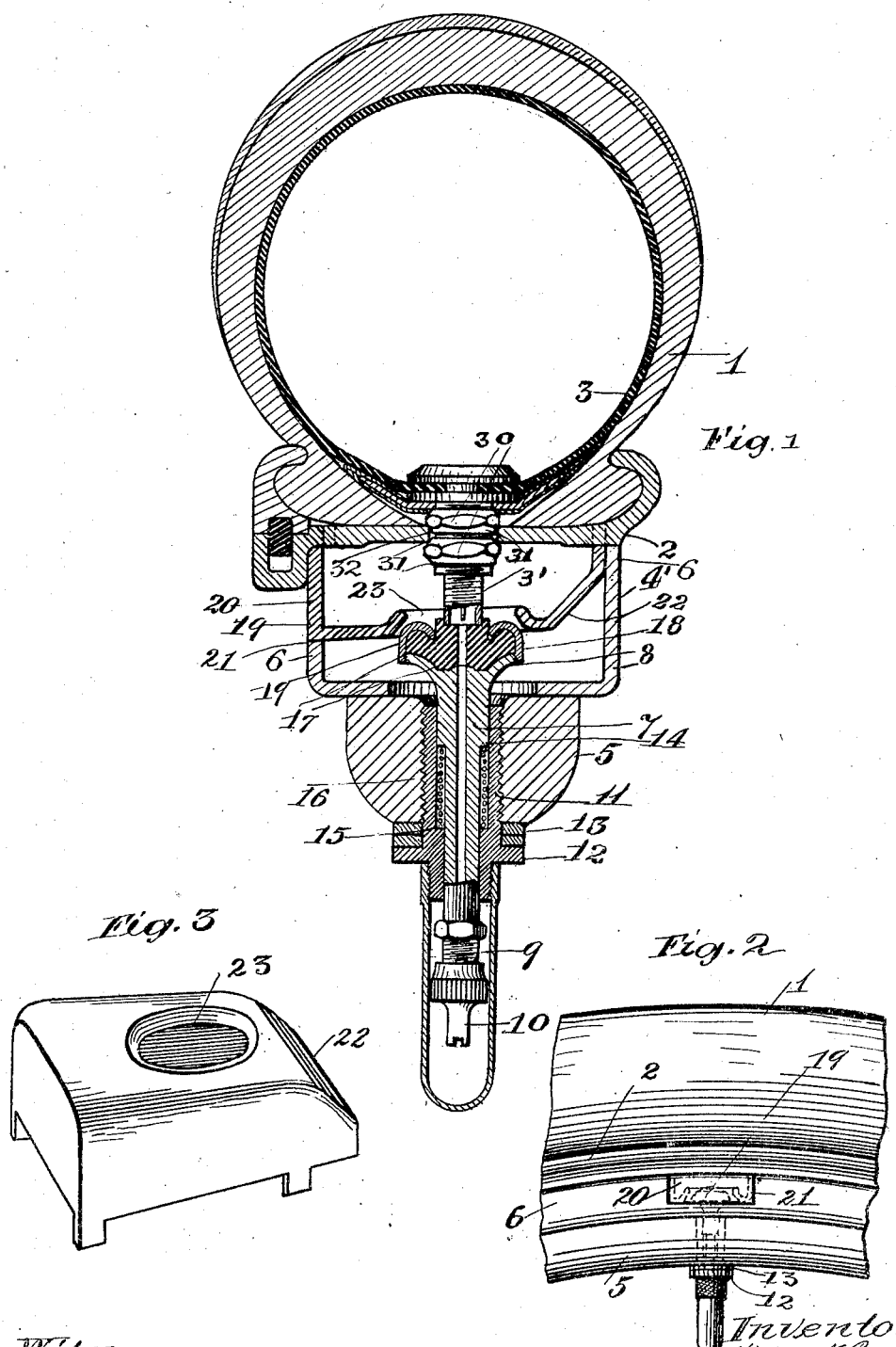

WILLIAM N. BOOTH, OF CLEVELAND, OHIO.

VALVE CONNECTION FOR DEMOUNTABLE RIMS.

1,044,435.   Specification of Letters Patent.   Patented Nov. 12, 1912.

Application filed June 2, 1911. Serial No. 630,967.

*To all whom it may concern:*

Be it known that I, WILLIAM N. BOOTH, a citizen of the United States, and resident of Cleveland, in the county of Cuyahoga and State of Ohio, have invented certain new and useful Improvements in Valve Connections for Demountable Rims, of which I hereby declare the following to be a full, clear, and exact description, such as will enable others skilled in the art to which it appertains to make and use the same.

The objects of the invention are to provide an automatically made connection between the valve tube and an inner tube adapted to communicate with the valve tube and located in the inner rim of a tire having both inner and outer rims, the outer one of which is demountable from the inner one, and is attached thereto by sliding it sidewise over the inner rim.

Heretofore difficulty has been experienced when both outer and inner rims were employed in obtaining access to the valve tube for inflating the tire and also in making an air tight connection between the valve tube for the outer rim which is secured in the outer rim and the inner tube which projects through the inner rim and the wheel felly.

By means of this improved device a second tube can be employed making a practically continuous air tight connection with the valve without danger of leakage when both rims are in place.

The invention comprises a tube mounted in the felly and projecting through the inner rim and made depressible by means of a spring. The outer end of this tube is provided with a compressible engaging surface such as rubber and means are provided for the automatic depression of this tube while drawing on and off the outer rim, after which it is permitted to spring out, and when alined with the valve tube in the outer rim the inner tube will immediately make perfect communication with the valve tube.

The invention further comprises the combination and arrangement of parts and construction of the various details as hereinafter described, shown in the accompanying drawings and specifically pointed out in the claims.

In the accompanying drawings Figure 1 is a transverse section of the tire and outer and inner rims and wheel felly showing the detail structure; Fig. 2 is a reduced side elevation of the same; Fig. 3 is a perspective view of the block or cleat which depresses the valve.

In these views 1 is the inflated tire, 2 the outer rim, 3 the inner tire, 4 the valve tube secured in the outer rim, 4' is a rigid channel shaped inner rim, sleeved over the felly 5. The outer rim fits closely upon the inner rim resting upon the sides 6, 6, of the channel.

In alinement with the valve tube is shown the inner tube 7 which is provided with an enlarged head 8 projecting into the channel of the inner rim, and which projects through the felly and is screw threaded at 9 so that a second valve 10 can be attached thereto. The inner tube is mounted for free longitudinal movement in a sleeve 11, secured in the felly and adjustable therein by means of a nut 12 and washer 13.

The inner tube is provided with a shoulder 14 and the sleeve with a corresponding shoulder 15 between which is placed the compression spring 16 adapted to exert a constant outward pressure on the inner tube.

The head of the inner tube is recessed at 17 and a centrally perforated rubber contact washer 18 is inclosed therein by means of the annular threaded cap 19.

In order to depress the inner tube when the outer rim is drawn over the inner one a block or cleat 20 is transversely placed upon the inner face of the outer rim and passes through an opening 21 in one wall of the channel. This block is curved or inclined at the entering and at 22 to depress the inner tube when it comes into contact with it, and is provided with a central opening 23 into which the valve tube projects. The outer sides of the opening 23 are beveled so that the head of the inner tube will readily slip into the opening when released by the block 20 and as the inner tube is released the rubber washer 18 will engage the end of the valve tube and insure a perfect seal therewith. The opening in the rubber will then permit of perfect communication between the tubes.

To insure a perfect centering and alinement of the outer and inner tubes the outer tube 3' is provided with clamping nuts 30 30, one on each side of the rim 2, and they are tapered at 31 on each edge so as to automatically center themselves and the tube in the opening 32.

Having described the invention what I claim as new and desire to secure by Letters Patent is:

1. The combination with an outer demountable rim, and an inner rim and felly, a valve tube secured in the outer rim, and projecting into the inner rim, a spring pressed depressible inner tube passing through the inner rim, a rigid support therefor, said outer rim slidingly movable over said inner rim, and a device for depressing said inner valve when the outer rim is put in place, said depressing device permitting the inner tube to come into alinement with said valve tube and to make continuous communication therewith.

2. The combination with an outer demountable rim and a fixed inner rim and felly, of a valve tube in the outer rim, a spring pressed inner tube in the inner rim, a device for depressing said inner tube when the outer rim is put in place on the inner rim, said depressing device provided with an opening inclosing said valve tube, said opening permitting said inner tube to engage and come into alinement with said valve tube, and communicate therewith, and means for sealing the valve tube in the inner tube.

3. The combination with an outer demountable tire and an inner rim, of a valve tube in the outer rim, and a spring pressed corresponding inner tube passing through the inner rim, a sleeve in which said inner tube is mounted, a compressible spring in said sleeve engaging said inner tube, a resilient washer adapted to seal the union between the inner and valve tubes, and means upon the outer rim for depressing the inner tube to permit of putting the outer rim in place over the inner rim, said means permitting the inner tube to make engagement with the valve tube when the parts are alined.

4. The combination with the outer demountable rim and valve therein for a pneumatic tire, of a fixed inner rim of channel shape, a felly on which the inner rim is mounted, a spring pressed inner tube passing through said inner rim and felly, an adjustable sleeve therefor, a resilient washer secured to the outer end of said inner tube adapted to engage the inner end of said valve tube, and seal the opening between the inner and valve tubes and a device for depressing the inner tube when the outer rim is placed over the inner rim, said device provided with an opening into which the valve tube projects, said opening permitting the inner tube to spring outwardly to make communication with the valve tube.

5. The combination with the outer demountable rim and valve therein, for a pneumatic tire, of a channel shaped inner rim and felly therefor, a spring pressed inner tube in said channeled inner rim, one of the walls of said channel provided with a lateral opening, a block transversely secured to the inner surface of the outer rim, said block adapted to pass through said opening in said wall, said block provided with a central opening into which said valve tube projects, said block provided with a front edge shaped to depress said inner valve as said outer rim is sleeved over said inner rim, and said inner tube adapted to enter said opening in said block, and communicate with said valve tube when the parts are in alinement.

6. The combination with the outer rim and valve tube for a pneumatic tire, of a channel shaped inner tube, a spring pressed inner tube for the inner rim, a device secured upon the outer rim for depressing the inner tube when the outer rim is applied to the channel rim, said channel rim having an opening in one wall permitting the said depressing device to enter said channel, said depressing device provided with an opening having beveled sides into which said valve tube projects, and said inner tube provided with a cavity in its outer end, and a resilient washer in said cavity.

7. The combination with inner and outer rim members, said outer member adapted to slide over the inner member, and a pneumatic tire on said outer member, of a separable valve tube for said pneumatic tire in registering outer and inner portions, one portion being in said tire and outer rim member, and the other portion yieldingly secured in said inner rim member, and a socket for said outer portion of said valve tube in said inner portion.

In testimony whereof, I hereunto set my hand this 20" day of May 1911.

WILLIAM N. BOOTH.

In presence of—
  WM. M. MONROE,
  P. BREDEL.

---

Copies of this patent may be obtained for five cents each, by addressing the "Commissioner of Patents, Washington, D. C."